Patented Oct. 25, 1949

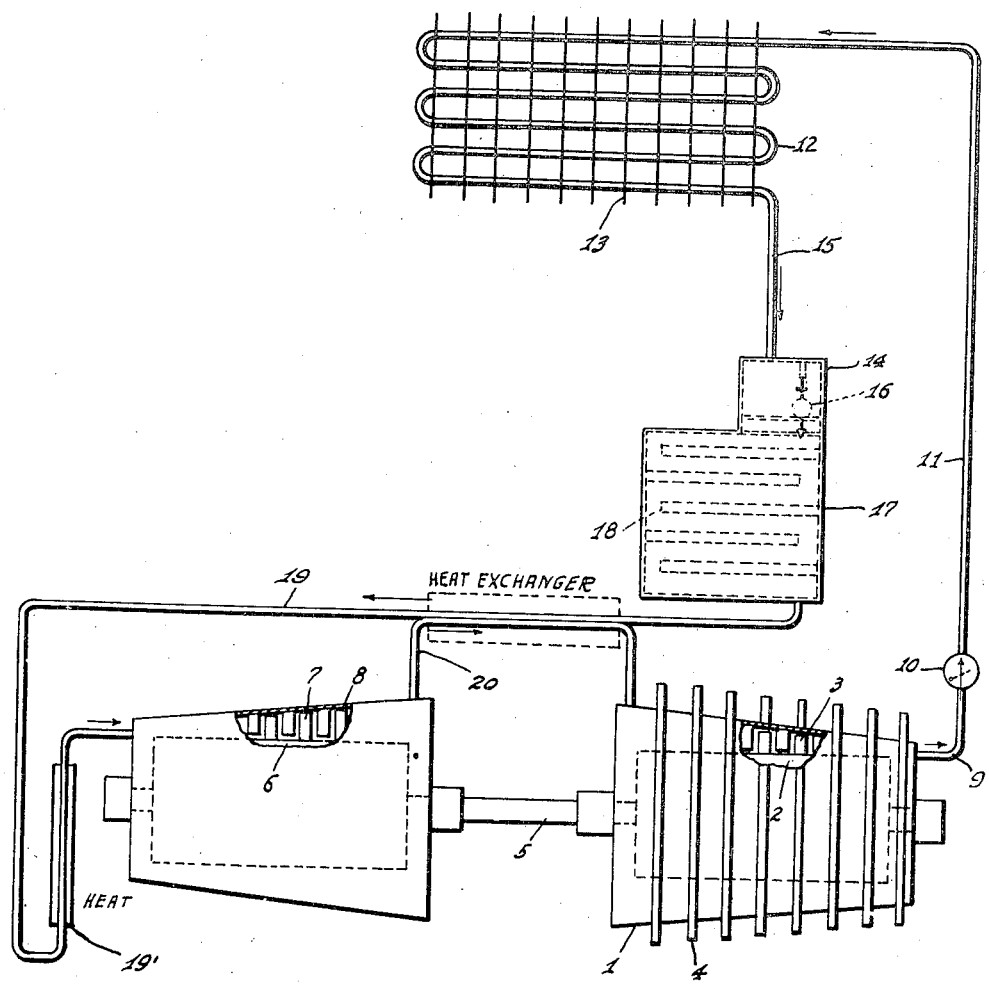

2,486,034

UNITED STATES PATENT OFFICE 2,486,034

HEAT OPERATED COMPRESSION REFRIGERATION

Abram Katzow, Indianapolis, Ind.

Application June 5, 1945, Serial No. 597,620

9 Claims. (Cl. 62—115)

This invention relates to the art of refrigeration, more particularly to refrigerating apparatus of compression type and still more particularly to refrigerating apparatus wherein a refrigerant is evaporated while extracting heat from the surroundings heated and expanded to provide motive power, condensed and again evaporated to extract heat from the surroundings, and is a continuation in part of my copending application Serial Number 583,302 filed March 17, 1945.

Various features and advantages will be brought out more fully in the following description in connection with the accompanying drawing in which reference character 1 designates a rotary compressor. 2 designates a rotor which rotates within the compressor in a usual manner. 3 designates blades attached to the rotor 2. Heat from the compressor 1 is given off to the atmospheric air by means of heat radiating fins 4 attached to the compressor. The rotor 2 is connected to a rotor 6 by means of a shaft 5. The rotor 6 rotates within a turbine 8 in a usual manner. 7 designates blades attached to the rotor 6. The outlet part of the compressor 1 is connected to a valve 10 by means of a conduit 9. A condenser 12 is connected to the valve 10 by means of a conduit 11. The condenser 12 is cooled by means of heat radiating fins 13 attached to the condenser 12. The condenser may be cooled by any other known means. The lower part of the condenser 12 is connected to a float valve chamber 14 by means of a conduit 15. A float valve 16 arranged within the float valve chamber 14. Instead of a float valve and the float valve chamber an expansion valve may be used. The float valve chamber 14 is connected to an evaporator 17. To provide a large evaporating surface, baffling plates 18 arranged within the evaporator. The gaseous space of the evaporator 17 is connected to the inlet of the turbine 8 by means of a conduit 19. A part of the conduit 19, indicated at 19', is heated by any known means, such as by means of coal gas. The outlet of the turbine 8 is connected to the inlet of the compressor 1 by means of a conduit 20. A part of the conduit 19 and a part of the conduit 20 form a temperature exchanger. The system contains a refrigerant, such as trichloromonofluoromethane (F11). Of course other refrigerants may be used and it should be distinctly understood that (F11) is used for illustration only.

The operation is as follows:

From the evaporator 17 gaseous refrigerant enters the conduit 19 where the gaseous refrigerant is heated, thus increasing the volume of the gaseous refrigerant before it enters the turbine 8. In the turbine the hot gaseous refrigerant expands and drives by means of the shaft 5 the rotor 2 of the compressor 1. From the outlet of the turbine 8 the gaseous refrigerant passes through the conduit 20 to the inlet of the compressor 1 and while passing through the conduit 20 the gaseous refrigerant gives up heat to the gaseous refrigerant in the conduit 19. The rotary compressor 1 delivers the gaseous refrigerant under pressure through the conduit 9 valve 10 and conduit 11 to the condenser 12. In the condenser the refrigerant while giving up heat is liquefied. From the condenser 12 the liquid refrigerant gravitates through the conduit 15 into the float valve chamber 14 and through the valve 16 into the evaporator 17 where the liquid evaporates while extracting heat from the surroundings, thus producing refrigeration. From the evaporator 17 gaseous refrigerant passes into the conduit 19 where it is heated before it enters the turbine 8.

While the invention has been shown in its preferred form, it will be understood that various changes and modifications may be evolved which fall within the spirit and scope of the invention.

Having thus described my invention what I claim is:

1. A refrigerating apparatus of compression type comprising a turbine, a rotary compressor, a shaft connecting a rotor from the turbine with a rotor from the compressor, a conduit connecting the outlet of the compressor with a valve, a conduit connecting the valve with a condenser, means to control the passage of liquid from the condenser to an evaporator, a conduit connecting the evaporator to the inlet of the turbine, a conduit in heat exchange relationship with the last mentioned conduit and connecting the outlet of the turbine with the inlet of the compressor, a refrigerant within the apparatus, and means of heating and cooling different parts of the apparatus.

2. A refrigeration process, comprising the cyclical steps of evaporating a liquid refrigerant to produce refrigeration, heating the evaporated refrigerant, extracting energy from the heated refrigerant, utilizing such energy to then compress the refrigerant, and condensing the refrigerant for re-evaporation, said steps being performed in the order recited.

3. A process as set forth in claim 2 with the addition of preheating refrigerant after said evaporating step and before said heating step with heat derived from refrigerant between said energy-extracting and compressing steps.

4. In a compression process of producing refrigeration including the steps of compressing a fluid refrigerant, condensing the refrigerant, and evaporating the refrigerant, the additional steps of heating the refrigerant while it is in a gaseous state, extracting energy from the heated refrigerant, utilizing such energy to compress the refrigerant, and cooling the gaseous refrigerant immediately prior to compressing it, said steps being performed in the order recited.

5. In a compression process of producing refrigeration including the steps of compressing a fluid refrigerant, condensing the refrigerant, and evaporating the refrigerant, the additional steps of heating the refrigerant while it is in a gaseous state, extracting energy from the heated refrigerant, utilizing such energy to compress the refrigerant, and radiating heat directly to a second fluid during the step of compressing the fluid refrigerant, in order to cool the refrigerant, said steps being performed in the order recited.

6. In refrigerating apparatus of the compression type, a compressor, a fluid motor for driving said compressor, a condenser, an evaporator, conduits for circulating a fluid refrigerant from the evaporator successively through the motor, compressor and condenser and back to the evaporator, and means for heating refrigerant entering the motor.

7. The invention set forth in claim 6 with the addition of means for cooling refrigerant entering the compressor.

8. The invention set forth in claim 6 with the addition of a heat exchanger connected in the conduit between the evaporator and heating means and in the conduit between the motor and compressor.

9. Refrigeration apparatus comprising a fluid motor, a compressor in which gaseous refrigerant is compressed, a condenser in which gaseous refrigerant is liquefied, and an evaporator in which the liquid refrigerant is evaporated, conduit means for conducting refrigerant through the apparatus and including first and second conduits for conducting refrigerant respectively to and from said motor, and means for heating the refrigerant passing through the first conduit, said second conduit being arranged in heat-exchanging relationship with the first conduit at a point of the latter in advance of said heating means, whereby heat in the refrigerant leaving the motor is transferred to refrigerant flowing to said heating means.

ABRAM KATZOW.

REFERENCES CITED

The following references are of record in the file of this patent:

UNITED STATES PATENTS

| Number | Name | Date |
| --- | --- | --- |
| 632,171 | Coleman | July 3, 1900 |
| 1,440,000 | Bonine | Dec. 26, 1922 |
| 1,871,244 | Stewart | Aug. 9, 1932 |
| 1,885,793 | Bailey | Nov. 1, 1932 |
| 2,088,609 | Randel | Aug. 3, 1937 |